Dec. 1, 1936.　　　F. E. CLEMONS　　　2,062,778
INDEPENDENT WHEEL SUSPENSION
Original Filed June 15, 1931
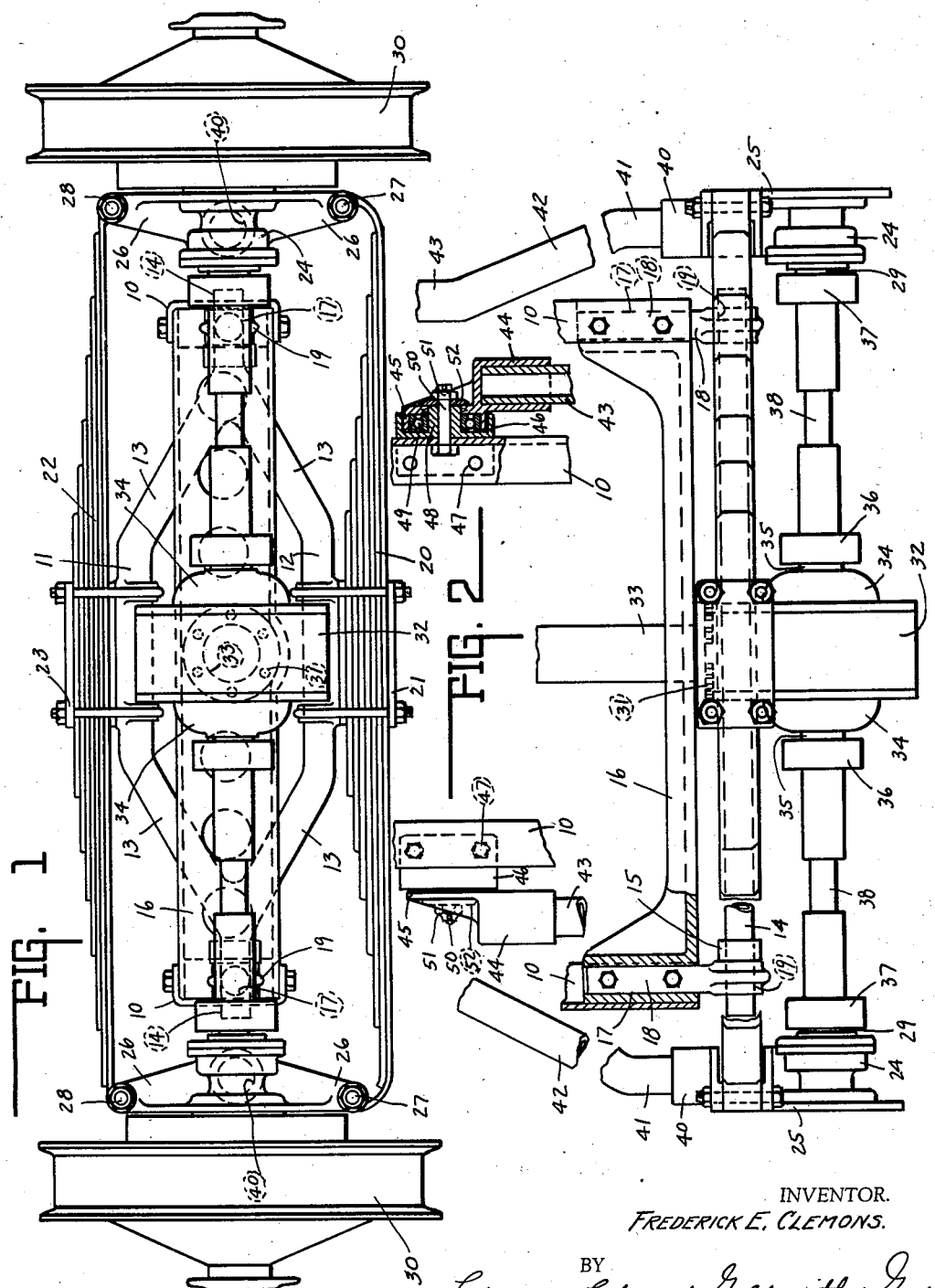
INVENTOR.
FREDERICK E. CLEMONS.
BY
Lockwood Lockwood Goldsmith + Galt
ATTORNEYS.

Patented Dec. 1, 1936

2,062,778

UNITED STATES PATENT OFFICE 2,062,778

INDEPENDENT WHEEL SUSPENSION

Frederick E. Clemons, Indianapolis, Ind.

Application June 15, 1931, Serial No. 544,327
Renewed April 9, 1934

4 Claims. (Cl. 180—73)

This invention relates to a driving wheel support or suspension for self-propelled vehicles and may, if desired, be applied to dirigible wheels for "front drive" applications.

The chief object of this invention is to mount the driving wheels of a self-propelled vehicle so that each wheel has relatively independent suspension with relation to the other wheel and the frame so that each wheel may be independently constrained toward the roadway or supporting surface so that maximum power will be derived from the driving and such constraint normally maintains the wheel in contact with the roadway for driving purposes a greater percentage of the time than heretofore has been the practice because this suspension or support also acts as a shock absorber in the sense that it dampens the rebound action of the wheel.

One feature of the invention consists in the provision of a so-called floating mounting for the driving wheels and the pivotal support thereof adjacent the forward portion of the frame in a rear wheel drive application so that the weight of the engine at the forward portion of the vehicle is utilized, and further so that the push or power application from the wheels is applied to the frame near the forward end thereof for approximating so-called front drive application of power, thereby having a tendency to materially reduce the sluing or skidding incident to rear wheel power application.

The full nature of the invention will be more clearly understood from the accompanying drawing and the following description and claims:

Fig. 1 is a rear elevational view of the invention applied to the rear of a chassis embodying the invention as applied to a rear drive self-propelled vehicle. Fig. 2 is a top plan view thereof, parts being broken away to show the same in section and other parts in detail, and for convenience, intermediate portions of the mounting and the frame are broken away.

In the drawing, 10 indicates the channels directed inwardly and forming the frame of a self-propelled vehicle. A substantially diamond shaped rear frame-forming member has the superposed central portions 11 and 12 connected together by the outwardly converging arms 13 which terminate in the intermediate and outwardly directed extension 14, the same being indicated by dotted lines in Fig. 1 and illustrated in full lines in the left hand portion in Fig. 2. Each extension 14 mounts a collar 15 that limits the transverse or axial movement of this diamond shaped frame member.

The frame members 10 are connected by the cross member or end brace 16 and each end includes a socket 17 that detachably receives the stem 18 of a rearwardly projecting arm or hanger terminating in a cylindrical socket 19, which mounts the extension 14.

From the foregoing, it is apparent that the diamond shaped rear frame member is rigid with the frame of the vehicle.

Suspended from the lower horizontal portion 12 of the diamond shaped member is a multiple leaf spring 20 suitably secured thereto as at 21. Superimposed upon the central portion 11 is another spring 22 suitably secured thereto as at 23.

An axle support includes the axle or drive shaft supporting portion 24 and offset forwardly therefrom is a portion 25 which terminates in two opposed pivotal supports 26 to which, as at 27 and 28, are connected the ends of the springs 20 and 22. The multiple leaf springs 20 and 22 thus normally constrain the driving axle support downwardly and attempt to resist any upward movement of said member. Rotatably supported in the axle bearing 24 is the axle 29 which is suitably connected to a drive wheel 30.

The cross member 16 suitably supports as at 31 the differential housing 32 which communicates with the propeller shaft tube 33. With this mounting, the differential housing and the propeller shaft tube are rigid with the frame. The differential housing is provided with the usual covers 34 through which project the driving shafts 35. Each driving shaft 35 is connected to a universal joint conventionally illustrated as at 36 and the driven shaft 29 is similarly connected to a universal joint 37, the two being united together by the shaft 38 for driving of the wheel 30.

The power transmitted from the engine to the differential construction is transmitted without any oscillation commonly found in self-propelled vehicles. All of the oscillation occurs between the differential and the driving wheel and as a result each wheel by reason of the constraint hereinbefore specified, remains in contact with the supporting roadway a greater proportion of the time and therefore, a greater driving efficiency is obtained from the same amount of power.

The axle supporting member which includes the bearing 24, the offset portion 25 and the two pivot providing portions 26 also includes a forwardly directed socket 40 which receives one end of a tube or support member 41 which is connected by an inwardly directed portion 42 to a forwardly directed end 43. The forwardly directed end 43 is receivable by a tubular socket 44, pivotally supported upon the frame 10 near the forward portion thereof and particularly near the engine mounting upon the frame. The two members 42 constitute radius members, reference being had to the vertical movement of the driving wheel, and constitute compression members, reference being had to the driving force when the vehicle is driven forwardly.

The socket 44 includes a circular portion 45 that is nestingly received by a circular portion 46 supported as at 47 upon the frame. Interposed between said two circular portions or rather the hub 48 of one of the same is an antifriction construction 49 and a retainer arrangement including the bolt 50, nut 51 and the cap plate or washer 52, serves to secure all of the members together and insures pivotal connection for mounting of the portion 43 upon the frame near the forward portion thereof.

The invention claimed is:

1. In a self-propelled vehicle, the combination with a frame, a driving member, and a pair of driving wheels, of a pair of large radius type supports, each pivotally supported at one end upon the side of the frame upon an axis parallel to the axis of one of the driving wheels, said supports constituting compression members while driving, said supports at the other ends supporting said wheels, a spring suspension support supported by the frame and including an aperture through which the driving member extends and operatively connected at opposite ends to the frame, a rectangular spring suspension construction supported by the suspension support and enveloping the same and supporting the wheels for independent wheel movement, and independent universally connected driving means operatively connected at the remote ends to the wheels and at the adjacent ends to the driving member, said large radius supports each including an aperture through which the driving means extends.

2. In an automobile chassis, the combination with a frame having two spaced longitudinally extending frame members connected together substantially at opposite ends, a pair of substantially axially aligned automobile wheels adjacent one end of the frame and in spaced relation to the frame and each other, and spring means operatively associated with the frame and extending laterally therefrom beyond the sides and towards the wheels, of a wheel support for each wheel rotatably supporting the wheel, means hingedly connecting the adjacent lateral end of the spring means to the wheel support, an arm connected at one end to said wheel support adjacent the wheel and extending toward the opposite end of the frame and inwardly toward the frame and terminating immediately adjacent the nearest longitudinal frame member, and means pivotally supporting the frame terminating end of the arm on said last mentioned frame member, the axes of the pivotal means for the arms lying in the same vertical plane transversely to the longitudinal axis of the frame, the projected pivotal axis of each arm intersecting the adjacent supporting frame portion, said arm and spring means constituting the sole support for the adjacent wheel, said arms having independent arcuate movement for providing independent up and down movement for each wheel, said pivotal means for each arm including a bracket rigidly mounted on said frame, the mounting portion of the arm including a circular means in axial registration with the frame, means supported by said bracket also of circular character, the two circular means having a telescopic association, and retaining means coaxial with the circular portions and constituting the pivotal connection.

3. In an automobile chassis, the combination with a frame having two spaced longitudinally extending frame members connected together substantially at opposite ends, a pair of substantially axially aligned automobile wheels adjacent one end of the frame and in spaced relation to the frame and each other, and spring means operatively associated with the frame and extending laterally therefrom beyond the sides and towards the wheels, of a wheel support for each wheel rotatably supporting the wheel, means hingedly connecting the adjacent lateral end of the spring means to the wheel support, an arm connected at one end to said wheel support adjacent the wheel and extending toward the opposite end of the frame and inwardly toward the frame and terminating immediately adjacent the nearest longitudinal frame member, and means pivotally supporting the frame terminating end of the arm on said last mentioned frame member, the axes of the pivotal means for the arms lying in the same vertical plane transversely to the longitudinal axis of the frame, the projected pivotal axis of each arm intersecting the adjacent supporting frame portion, said arm and spring means constituting the sole support for the adjacent wheel, said arms having independent arcuate movement for providing independent up and down movement for each wheel, said pivotal means for each arm including a bracket rigidly mounted on said frame, the mounting portion of the arm including a circular means in axial registration with the frame, means supported by said bracket also of circular character, the two circular means having a telescopic association, retaining means coaxial with the circular portions and constituting the pivotal connection, and friction modifying means operatively associated with the telescopically associated circular means and enclosed thereby.

4. In an automobile chassis, the combination with a frame having two spaced longitudinally extending frame members connected together substantially at opposite ends, a pair of substantially axially aligned automobile wheels adjacent one end of the frame and in spaced relation to the frame and each other, and spring means operatively associated with the frame and extending laterally therefrom beyond the sides and towards the wheels, of a wheel support for each wheel rotatably supporting the wheel, means hingedly connecting the adjacent lateral end of the spring means to the wheel support, an arm connected at one end to said wheel support adjacent the wheel and extending toward the opposite end of the frame and inwardly toward the frame and terminating immediately adjacent the nearest longitudinal frame member, and means pivotally supporting the frame terminating end of the arm on said last mentioned frame member, the axes of the pivotal means for the arms lying in the same vertical plane transversely to the longitudinal axis of the frame, the projected pivotal axis of each arm intersecting the adjacent supporting frame portion, said arm and spring means constituting the sole support for the adjacent wheel, said arms having independent arcuate movement for providing independent up and down movement for each wheel, said pivotal means for each arm including a bracket rigidly mounted on said frame, the mounting portion of the arm including a circular means in axial registration with the frame, means supported by said bracket also of circular character, the two circular means having a telescopic association, retaining means coaxial with the circular portions and constituting the pivotal connection, and anti-friction means operatively associated with the telescopically associated circular means and enclosed thereby.

FREDERICK E. CLEMONS.